United States Patent [19]
Ohsawa

[11] Patent Number: 5,530,513
[45] Date of Patent: *Jun. 25, 1996

[54] FOCUS DETECTING DEVICE AND METHOD OF OPERATION

[75] Inventor: Keiji Ohsawa, Tokyo, Japan

[73] Assignee: Nikon Corporation, Tokyo, Japan

[*] Notice: The term of this patent shall not extend beyond the expiration date of Pat. No. 5,393,969.

[21] Appl. No.: 355,254

[22] Filed: Dec. 9, 1994

Related U.S. Application Data

[63] Continuation-in-part of Ser. No. 266,315, Jun. 27, 1994, Pat. No. 5,393,969, which is a continuation of Ser. No. 5,144, Jan. 15, 1993, abandoned.

[30] Foreign Application Priority Data

| Jan. 22, 1992 | [JP] | Japan | 4-031600 |
| Nov. 13, 1992 | [JP] | Japan | 4-328656 |
| Dec. 9, 1993 | [JP] | Japan | 5-309198 |

[51] Int. Cl.$^6$ ............................................. G03B 13/36
[52] U.S. Cl. ........................................................... 354/402
[58] Field of Search ............................. 354/402, 406, 354/407, 408; 250/201.8

[56] References Cited

U.S. PATENT DOCUMENTS

| 4,387,975 | 6/1983 | Anaki | 354/407 |
| 4,562,345 | 12/1985 | Aoki et al. | 354/407 X |
| 4,878,079 | 10/1989 | Hamada et al. | 354/402 |
| 5,393,969 | 2/1995 | Ohsawa | 354/407 X |

FOREIGN PATENT DOCUMENTS

| 2-120712 | 5/1990 | Japan . |
| 5-264894 | 10/1993 | Japan . |

*Primary Examiner*—W. B. Perkey
*Attorney, Agent, or Firm*—Oliff & Berridge

[57] ABSTRACT

A focus-detecting device for receiving light rays from a photographic field to detect a state of focus of a lens includes a sensor positioned to receive light rays from the photographic field. The sensor includes a plurality of sensor elements, at least one of the sensor elements being adjustably positionable independently of another of the sensor elements. A plurality of light-receiving components are coupled with the sensor elements to receive the light rays transmitted from the photographic field. The light-receiving components are grouped into a plurality of detectors coupled with one of the sensor elements to detect different areas in the photographic field to detect a state of focus of the lens. A method of use also is disclosed.

27 Claims, 8 Drawing Sheets

FOCUS DETECTING DEVICE AND METHOD OF OPERATION

This is a Continuation-In-Part of application Ser. No. 08/266,315, filed Jun. 27, 1994 (now U.S. Pat. No. 5,393, 969), which in turn is a continuation of application Ser. No. 08/005,144, filed Jan. 15, 1993, abandoned.

BACKGROUND OF THE INVENTION

1. Field of the Invention

The present invention relates to a focus-detecting device, and more particularly, to a focus-detecting device used to detect a focus state of a photographic lens in a camera or similar mechanism.

2. Description of Related Art

Numerous focus detection devices using a phase difference method have been developed for cameras and similar mechanisms. Light rays passing through different regions on an exit pupil of a photographic lens are composed into images on a pair of light-receiving components in a line sensor after passing through a field lens and a pair of re-imaging lenses. The focus state of the photographic lens is detected from the positional relationship of the pair of images.

Figure 11:
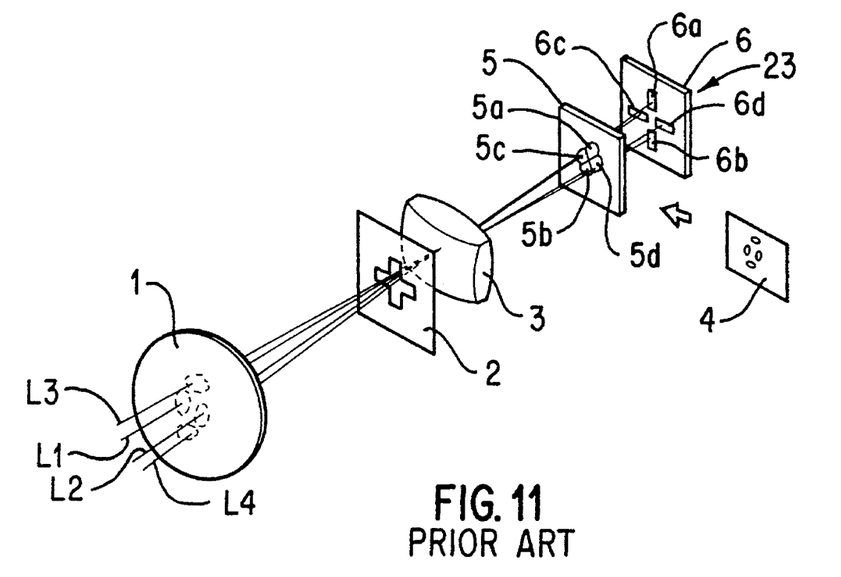
FIG. 11 is a perspective view showing a general focus detection device with intersecting areas.

FIG. 11 shows one type of a conventional focus detection device using this method. In this focus detection device, light rays L1–L4 passing through different regions of the exit pupil 1 of the photographic lens pass through a field mask 2, which determines the range of the distance measuring areas and which is positioned near the predetermined focal plane of the photographic lens. Light rays L1–L4 are composed into images on the line sensor 6 by a re-imaging lens 5 after passing through an aperture mask 4.

The focus detection device comprises a so-called cross-type device. The re-imaging lens 5 includes two pairs of lens components 5a, 5b, 5c and 5d. The line sensor 6 includes two pairs of light-receiving components 6a, 6b, 6c and 6d. Corresponding focus state detection areas are formed of intersecting areas that extend in different directions so as to intersect. By arranging the pairs of lenses 5a, 5b, 5c and 5d and light-receiving components 6a, 6b, 6c and 6d perpendicularly, distance measurement is possible for objects in all directions. Even when an object extends parallel to one of the distance measurement areas in the photographic field, distance measurement is possible with the other distance measurement areas.

Conventionally, several such focus detection devices include a cross-type arrangement, which has a plurality of focus state detection optical systems and in which distance measurement is possible in a plurality of areas in the photographic field.

Figure 12:
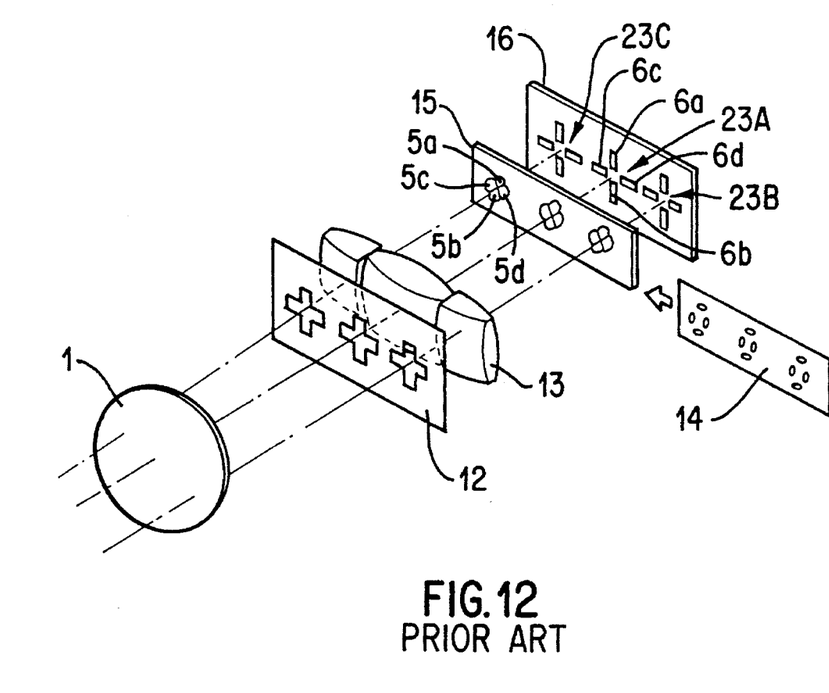
FIG. 12 is a perspective view showing a focus detection device having a plurality of intersecting areas.
Figure 13:
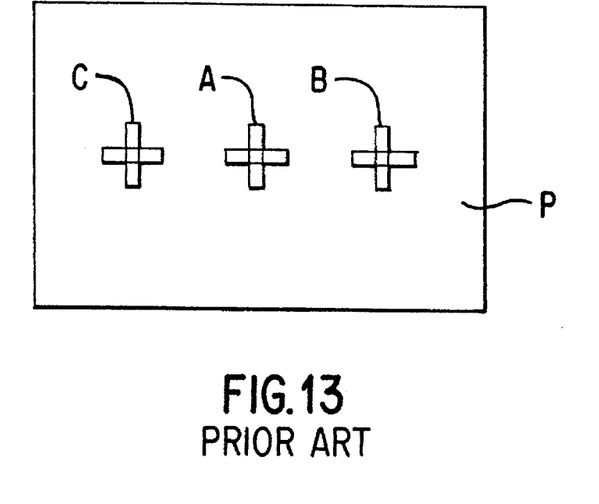
FIG. 13 shows focus state detection areas in the FIG. 12 focus detection device.

FIG. 12 shows one example of such a device, in which a focus detection device includes three cross-type focus state detection optical systems as shown in FIG. 11, arranged in a line, so that distance measurement is accomplished at three locations in the photographic field. With this focus detection device, cross-type distance measurement is possible not only in the intersecting areas A (FIG. 13) in the center of the photographic field P, but also in the intersecting areas B and C to the left and right of the center. Furthermore, with this focus detection device, the field masks 12, the field lenses 13, the aperture masks 14, the re-imaging lenses 15 and the line sensors 16 each are constructed integrally as single units to provide compactness.

Figure 14:
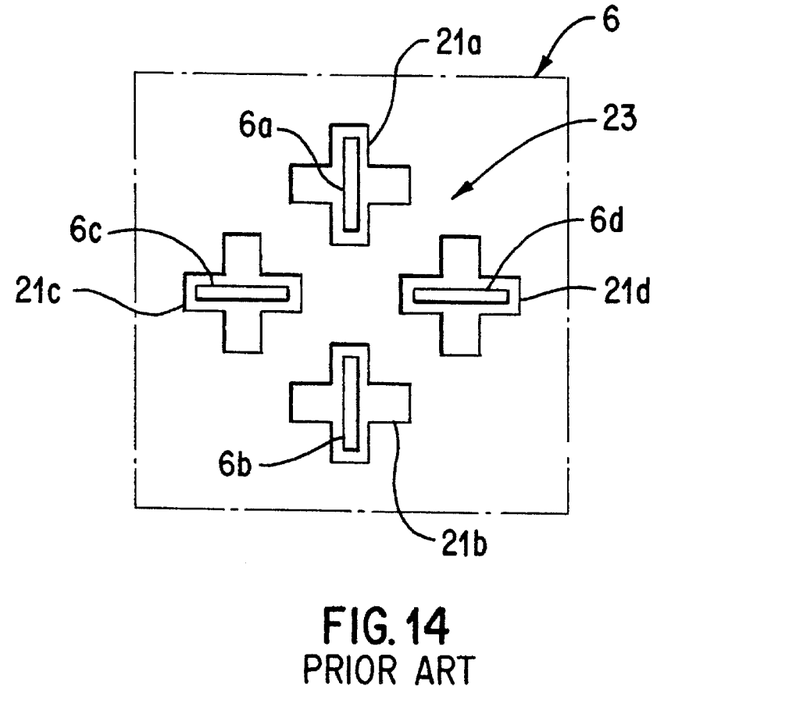
FIG. 14 shows the positional relationship between images of lenses and light-receiving components for intersecting areas.

However, in the focus detection device of FIG. 12, images on the predetermined focal plane are formed by the re-imaging lens 15 on the line sensor 6 as shown in FIG. 14. The focus state is detected by converting each of the images 21a, 21b, 21c and 21d into an electrical signal by means of the light-receiving components 6a, 6b, 6c and 6d on the line sensor 16, i.e. the intersecting areas detection unit 23, and by processing the electrical signals.

Figure 15:
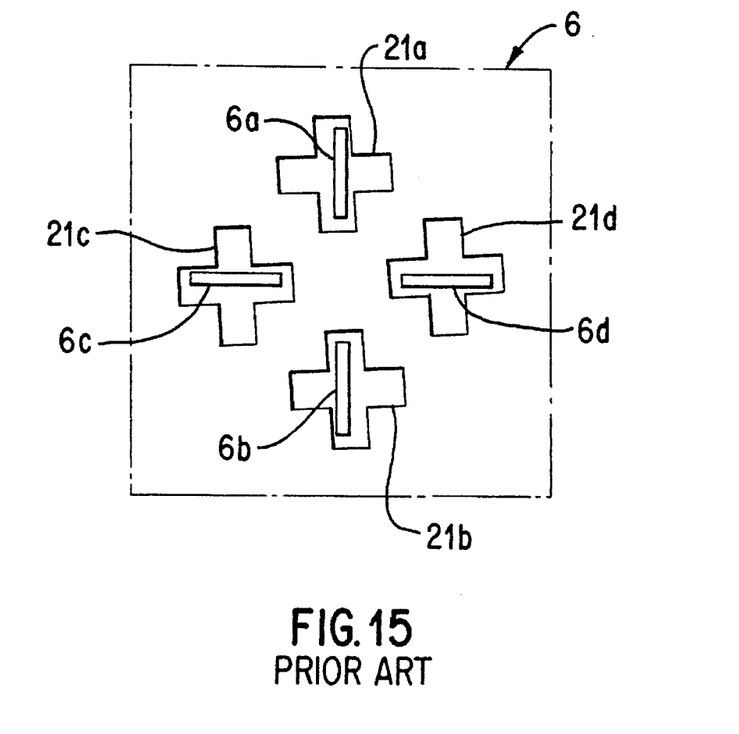
FIG. 15 shows the positional relationship between images of lenses and light-receiving components for intersecting areas.

Furthermore, the positioning of the images 21a, 21b, 21c and 21d and the light-receiving components 6a, 6b, 6c and 6d can be skewed, as shown in FIG. 15, because of skewing of the mutual positioning of the lenses 5a, 5b, 5c and 5d and the light-receiving components 6a, 6b, 6c and 6d. Light-receiving components 6a–6d are in pairs 6a–6b and 6c–6d, and perform focus state detection in the same regions of the photographic field P. Components 6a–6d receive light rays from different areas in the photographic field P. Consequently, accurate focus state detection cannot be accomplished. Accordingly, in such a case, it often is necessary to adjust positioning by moving the line sensor 6 as a whole in the re-imaging plane to achieve the state shown in FIG. 14.

Figure 16:
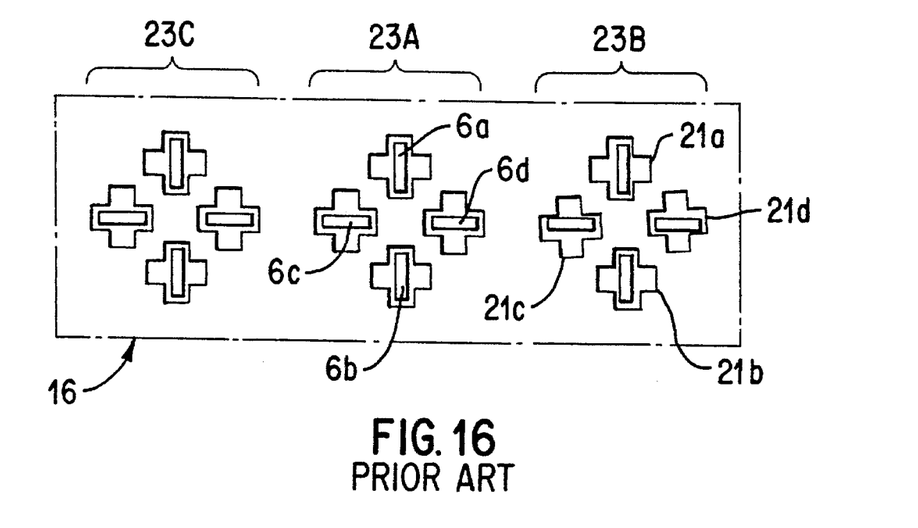
FIG. 16 shows the positional relationship between images of lenses and light-receiving components for a plurality of intersecting areas.

However, it is extremely difficult to adjust the position of the line sensor 16 in a focus detection device such as shown in FIG. 12, for example, in which the line sensor 16, on which are positioned three intersecting areas detection units 23A, 23B and 23C, is in a single line sensor package. For example, as shown in FIG. 16, consider the case when the positional relationship between the four images 21a, 21b, 21c and 21d and the light-receiving components 6a, 6b, 6c and 6d agree in the intersecting areas detection units 23A and 23C as a result of adjustment. If the positional relationship between the four images 21a, 21b, 21c and 21d and the light-receiving components 6a, 6b, 6c and 6d is skewed in the intersecting areas detection unit 23B, it is impossible to adjust the mutual positions of the four images 21a, 21b, 21c and 21d and the light-receiving components 6a, 6b, 6c and 6d in the intersecting areas detection unit 23B without destroying the positional relationship between the four images 21a, 21b, 21c and 21d and the light-receiving components 6a, 6b, 6c and 6d in the intersecting areas detection units 23A and 23C.

For this reason, because the three intersecting areas detection units 23A, 23B and 23C are in a single line sensor 16 package, when the line sensor 16 package is rotated to adjust the position in intersecting areas detection unit 23B, the positional relationship is destroyed in intersecting areas detection units 23A and 23C, in which the positions agreed prior to the adjustment.

The same problem exists in focus detection devices in which two intersecting areas detection units are in a single line sensor package, and is a problem common to all devices wherein a plurality of intersecting areas detection units are collected into a single line sensor package.

SUMMARY OF THE INVENTION

To overcome the above and other problems, an object of an embodiment of the present invention is to provide a focus detection device in which positional adjustment of a line sensor can be accomplished accurately without unnecessarily increasing the number of line sensor packages.

According to one embodiment, a focus-detecting device for receiving light rays from a photographic field to detect a state of focus of a lens includes a sensor positioned to receive light rays from the photographic field. The sensor includes a plurality of sensor elements, at least one of the sensor elements being adjustably positionable independently of another of the sensor elements. A plurality of light-receiving components are coupled with the sensor elements to receive the light rays from the photographic field. The light-receiving components are grouped into a plurality of detectors that detect different areas in the photographic field to detect a state of focus of the lens.

DETAILED DESCRIPTION OF PREFERRED EMBODIMENTS

The above and other objects and features of embodiments of the present invention will be clearly understood from the following description, when considered in conjunction with the accompanying drawings.

Figure 1:
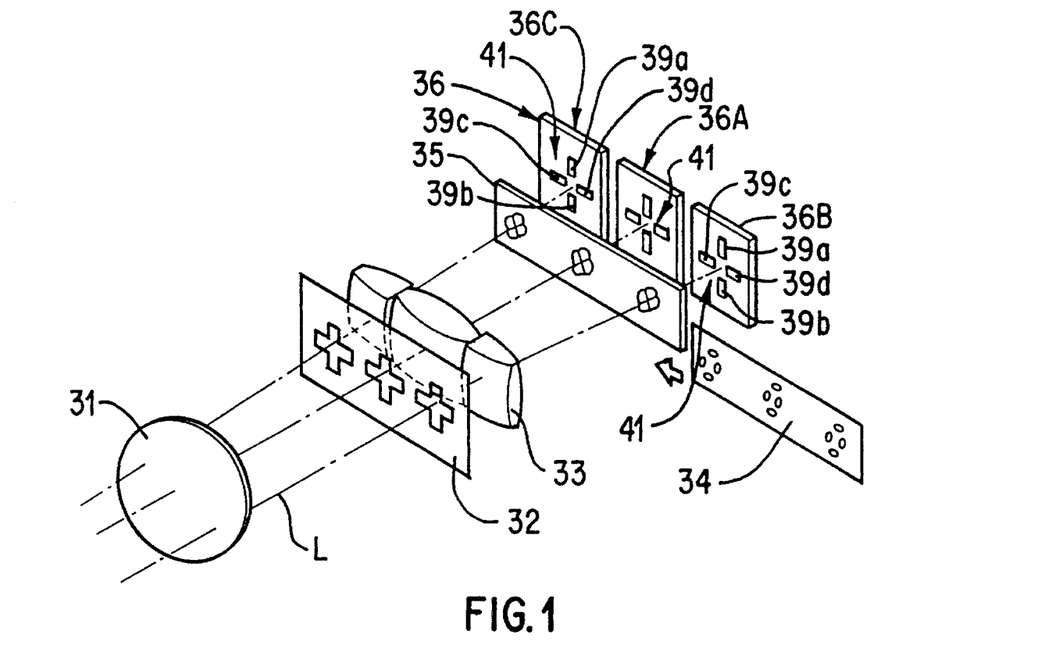
FIG. 1 is a perspective view showing a focus detection device according to an embodiment of the present invention.

FIG. 1 shows a first embodiment of a focus-detecting device, that is, a focus detection device, according to the present invention. Light rays L from different regions in a photographic field pass through the exit pupil 31 of the photographic lens and pass through the field mask 32, which determines the range of the distance measurement regions and which is positioned near the predetermined focal plane of the photographic lens. Light rays L then pass through a field lens 33 and an aperture mask 34 and are composed into an image on the line sensor 36 by a re-imaging lens 35.

Figure 2:
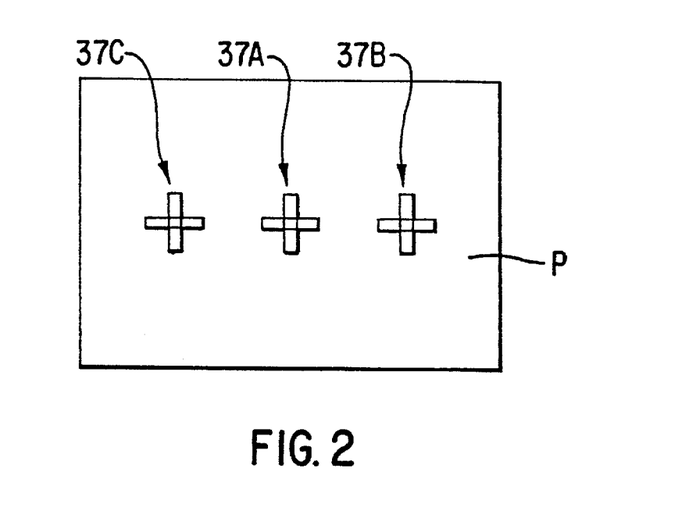
FIG. 2 shows focus state detection areas in the FIG. 1 focus detection device.

According to this embodiment, three of the above-described cross-type focus state detection optical systems shown in FIG. 11 are lined up and distance measurement is accomplished at three locations in the photographic field. Cross-type distance measurement is possible not only in the intersecting areas 37A in the center of the photographic field P but also in intersecting areas 37B and 37C to the left and right of intersecting area 37A, as shown in FIG. 2. The field mask 32, the field lens 33, the aperture mask 34 and the re-imaging lens 35 preferably each are constructed integrally as a single unit. Furthermore, the line sensor 36 is divided into three line sensor elements, that is, three line sensor packages 36A, 36B and 36C.

Each of the line sensor packages 36A, 36B and 36C includes four light-receiving components $39a$, $39b$, $39c$ and $39d$, which can define and function as an intersecting areas detection unit 41 that conducts focus state detection in the intersecting areas 37A, 37B and 37C. Intersecting areas detection units 41 preferably are provided in each of the separate line sensor packages 36A, 36B and 36C. Hence, it is possible to adjust the positions of the intersecting areas detection units 41 independently. Adjusting the position of one intersecting areas detection unit 41 does not affect the precision of adjustment of the other intersecting areas detection units, thereby enhancing the adjustment precision of each of the intersecting areas 37A, 37B and 37C.

Figure 3:
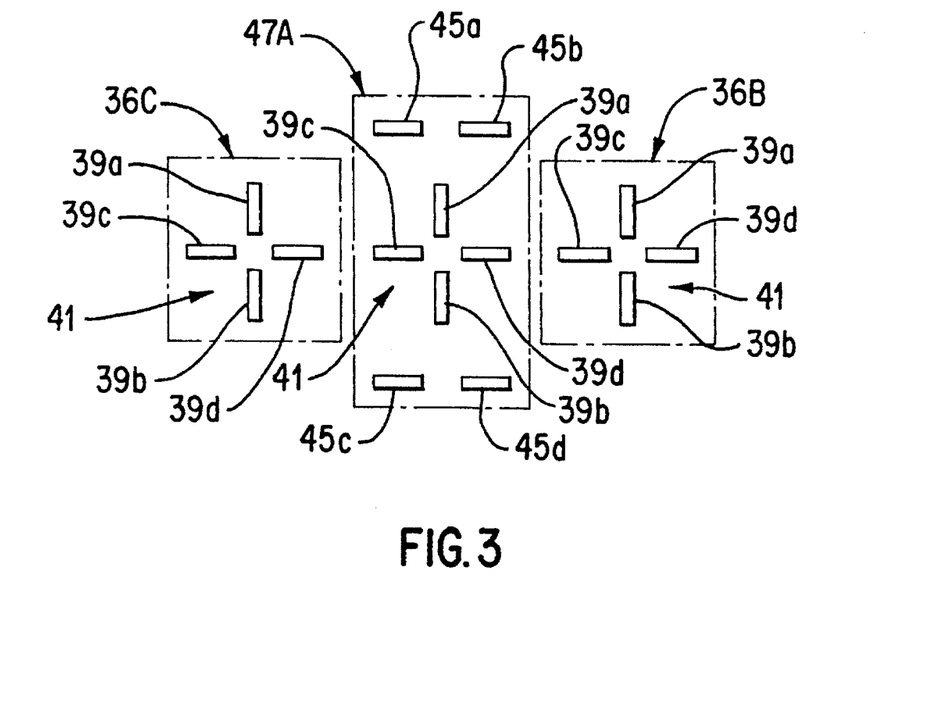
FIG. 3 shows a focus detection device line sensor according to a second embodiment of the present invention.
Figure 4:
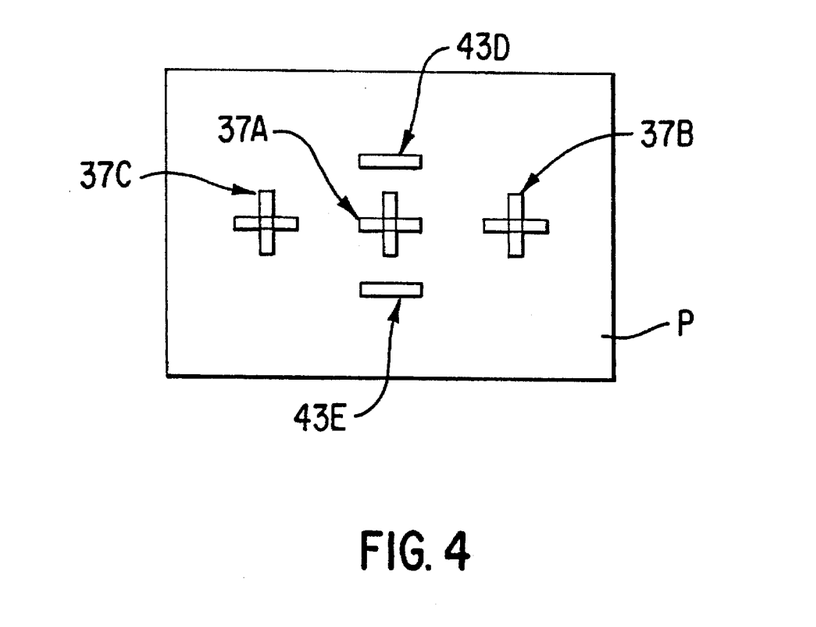
FIG. 4 shows focus state detection areas in the FIG. 3 focus detection device.

FIG. 3 shows a second focus detection device embodiment according to the present invention. According to this embodiment, as shown in FIG. 4, distance measurement is possible in five areas 37A, 37B, 37C, 43D and 43E in the photographic field P. In other words, in addition to the intersecting areas 37A, 37B and 37C of the FIG. 1 embodiment, areas 43D and 43E extend laterally above and below the intersecting areas 37A in the center of the photographic field P. The arrangement of the light-receiving components $39a$, $39b$, $39c$, $39d$, $45a$, $45b$, $45c$, $45d$ is indicated in solid lines in FIG. 3.

If the line sensor is divided into components for each of the areas 37A, 37B, 37C, 43D and 43E for the purpose of positional adjustment, the number of line sensor packages is five and positional adjustment is extremely troublesome. In addition, due to the relationship between the vertical and horizontal dimensions of the photographic field P, the spacing between the central intersecting areas 37A and the areas 43D and 43E above and below the central area is smaller than the spacing between the central area and the intersecting areas 37B and 37C to the left and right of the central area. Consequently, the spacing between light-receiving component $39a$ and components $45a$ and $45b$ is smaller, and it is difficult to create the extra space needed for separate packages for the line sensors corresponding to areas 37A, 43D and 43E.

According to this embodiment, the light-receiving components $39a$, $39b$, $39c$, $39d$, $45a$, $45b$, $45c$ and $45d$ corresponding to areas 37A, 43D and 43E are collected into a single line sensor package 47A, as indicated by the dashed lines in FIG. 3. The intersecting areas detection units 41, including light-receiving components $39a$, $39b$, $39c$ and $39d$ corresponding to areas 37B and 37C, individually are collected into separate line sensor packages 36B and 36C.

Thus, the light-receiving components $39a$, $39b$, $39c$, $39d$, $45a$, $45b$, $45c$ and $45d$ corresponding to areas 37A, 43D and 43E are collected into a single line sensor package 47A. Because areas 43D and 43E are not intersecting areas, only one pair of lenses is needed to correspond to these areas, and there is no need to establish lens pair orthogonality. In other words, in the production of re-imaging lenses, it is relatively straightforward to arrange a pair of non-intersecting lenses, along a direction along which two pairs of lenses extend, orthogonal to lenses for the central intersecting areas 37A. This enables production of highly precise reimaging lenses. It is more difficult to arrange a plurality of pairs orthogonal to the lens for intersecting areas 37A lined up in a uniform direction.

On the other hand, the precision of the light-receiving components formed in the line sensor is in general sufficiently high compared to the precision of the re-imaging lenses.

As a result, if positional adjustment of the images and light-receiving components in a single intersecting areas detection unit 41 occurs, positional adjustment can be accomplished simultaneously in areas 43D and 43E within the precision of the component parts. In other words, although the same degree of precision possible with independent adjustment of the non-intersecting areas 43D and 43E cannot necessarily be maintained, the precision of the focus state detection optical system can be kept within a desired range. No problems occur, due to improved component precision of the re-imaging lenses.

Thus, despite an increase in the number of areas, by placing the non-intersecting areas 43D and 43E in the same line sensor package 47A as the intersecting areas 37A, and dividing the line sensor so that each of the line sensor packages 47A, 36B and 36C each has a single pair of intersecting areas 37A, 37B or 37B, positional adjustment can be made easier without unnecessarily increasing the number of line sensor packages to correspond to the number of areas.

Figure 5:
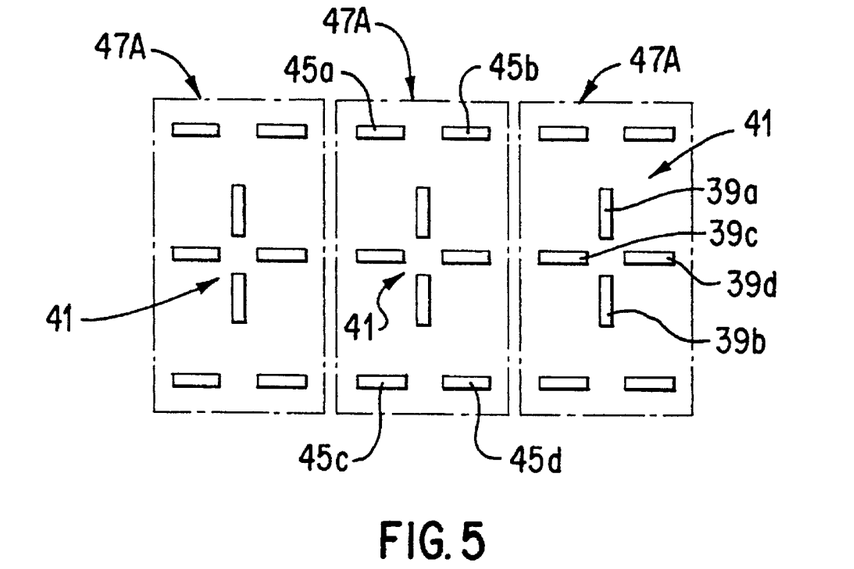
FIG. 5 shows a focus detection device line sensor according to a third embodiment of the present invention.
Figure 6:
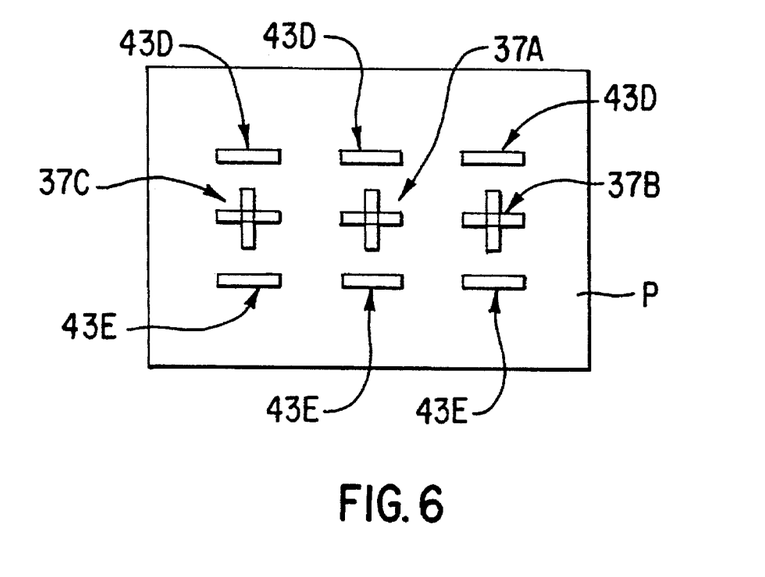
FIG. 6 shows focus state detection areas in the FIG. 5 focus detection device.

FIG. 5 shows a third focus detection device embodiment according to the present invention. According to this embodiment, distance measurement is possible in nine areas 37A, 37B, 37C, 43D and 43E in the photographic field, as shown in FIG. 6. In addition to the intersecting areas 37A, 37B and 37C of the FIG. 1 embodiment, areas 43D and 43E extend horizontally in the photographic field P above and below each of the intersecting areas 37A, 37B and 37C. The light-receiving components 39a, 39b, 39c and 39d comprising the intersecting areas detection unit 41, and the light-receiving areas 45a, 45b, 45c and 45d forming areas 43D and 43E, are in a single line sensor package 47A, as indicated by the dashed lines, so that the line sensor is divided into three line sensor packages 47A.

With the focus detection device according to this embodiment, similar results can be attained as are attained with the previous embodiments.

Figure 7:
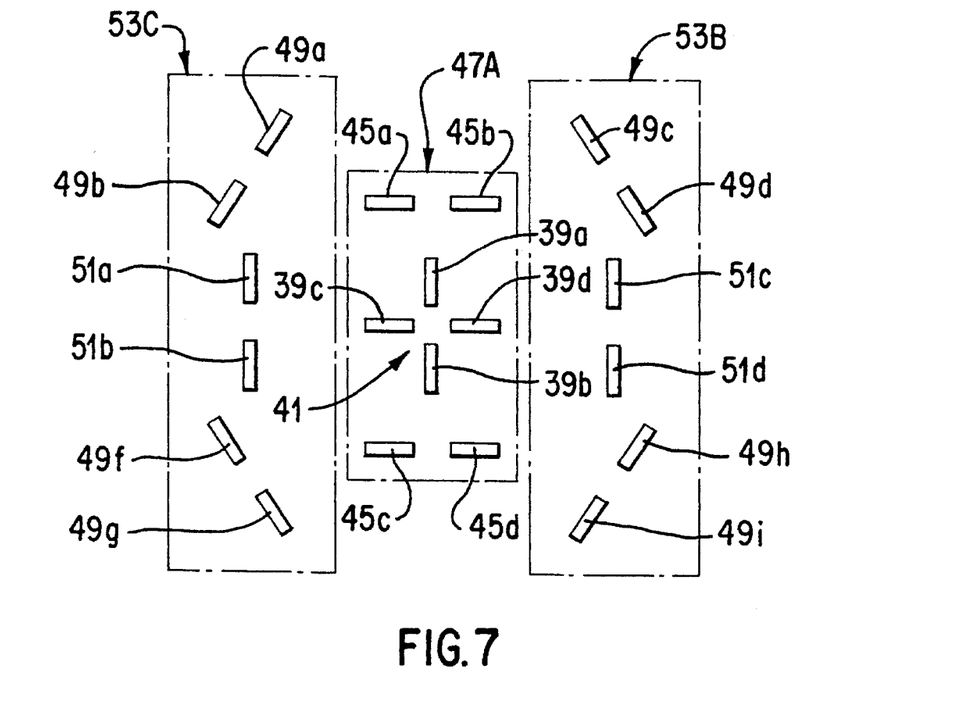
FIG. 7 shows a focus detection device line sensor according to a fourth embodiment of the present invention.
Figure 8:
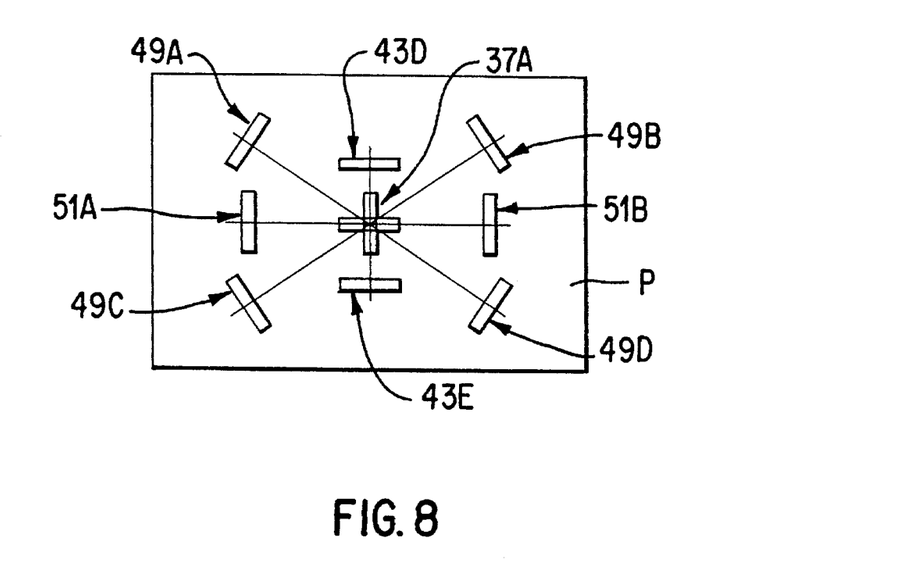
FIG. 8 shows focus state detection areas in the FIG. 7 focus detection device.

FIG. 7 shows a fourth focus detection device embodiment according to the present invention. According to this embodiment, distance measurement is possible in nine areas 37A, 43D, 43E, 49A, 49B, 49C, 49D, 51A and 51B, as shown in FIG. 8. Around the central intersecting areas 37A are arranged eight non-crossing areas 43D, 43E, 49A, 49B, 49C, 49D, 51A and 51B, which extend in directions perpendicular to lines passing through the center of the intersecting areas 37A and the center of its own area.

According to this embodiment, the light-receiving components 39a, 39b, 39c, 39d, 45a, 45b, 45c and 45d corresponding to areas 37A, 43D and 43E are in a single line sensor package 47A, as indicated by the dashed lines. The light-receiving components 49a, 49b, 51a, 51b, 49f and 49g, corresponding to areas 49A, 51A and 49C, and light-receiving components 49c, 49d, 51c, 51d, 49h and 49i, corresponding to areas 49B, 51B and 49D, are in separate line sensor packages 53C and 53B.

With the focus detection device according to this embodiment, similar results can be attained as are attained with the previous embodiments.

Figure 9:
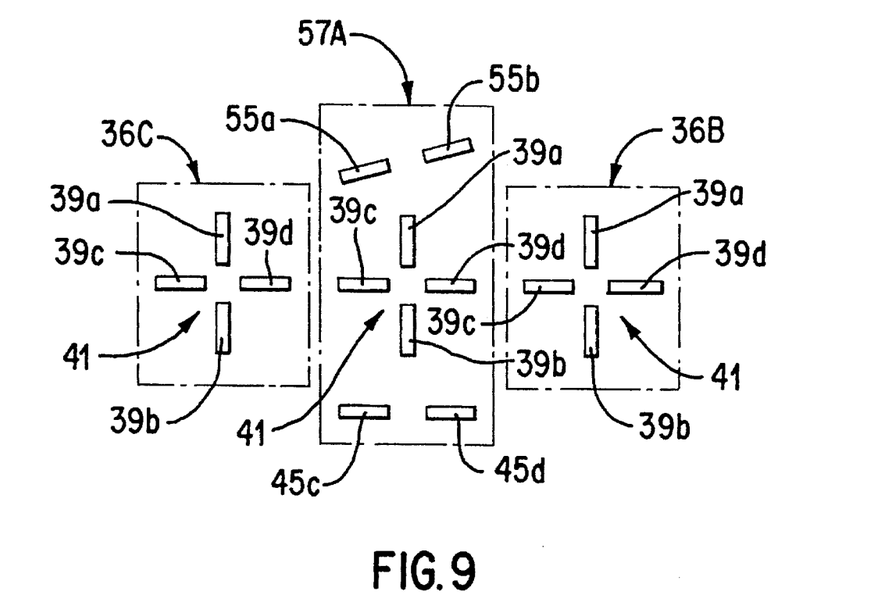
FIG. 9 shows a focus detection device line sensor according to fifth embodiment of the present invention.
Figure 10:
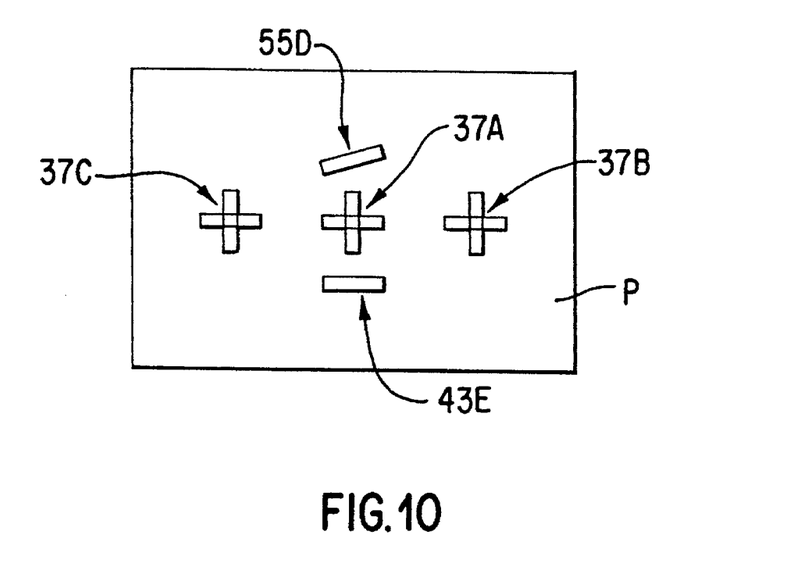
FIG. 10 shows focus state detection areas in the FIG. 9 focus detection device.

FIG. 9 shows a fifth focus detection device embodiment according to the present invention. According to this embodiment, distance measurement is possible in five areas 37A, 37B, 37C, 43E, 55D, as shown in FIG. 10.

The area 43D above the central intersecting areas 37A of the FIG. 3 embodiment is replaced by an area 55D, which is inclined with respect to the photographic field P. The light-receiving components 39a, 39b, 39c, 39d, 45c, 45d, 55a and 55b, corresponding to areas 37A, 43E and 55D, are collected into a single line sensor package 57A, as indicated by the dashed lines. The light-receiving components 39a, 39b, 39c and 39d corresponding to areas 37B and 37C are collected into separate line sensor packages 36B and 36C.

With the focus detection device according to this embodiment, similar results can be attained as are attained with the previous embodiments.

As explained above, with embodiments of the present invention, the intersecting areas detection units, which are difficult to position, each are positioned in separate line sensor packages. Thus it is possible to accomplish independent positional adjustment of the intersecting areas detection units. Consequently, adjusting one intersecting areas detection unit does not affect the precision of adjustment of the other intersecting areas detection units, thereby enhancing overall adjustment precision. In addition, by including non-intersecting areas, for which precision is easy to attain, in the same line sensor package as intersecting areas, it is possible to accomplish accurate line sensor positional adjustment without unnecessarily increasing the number of line sensor packages, thereby providing a focus detection device with high precision.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A focus-detecting device for receiving light rays from a photographic field to detect a state of focus of a lens, the focus-detecting device comprising:

a sensor positioned to receive light rays from the photographic field, the sensor comprising a plurality of sensor elements, at least one of the sensor elements being adjustably positionable independently of another of the sensor elements; and a plurality of light-receiving components coupled with each sensor element to receive the light rays from the photographic field, at least some of the light-receiving components being grouped to form a plurality of detectors that detect different areas in the photographic field to detect a state of focus of the lens, at least one of said plurality of sensor elements having one detector that is an intersecting areas detector that detects mutually intersecting areas in the photographic field, and another of said plurality of sensor elements has less than two of said intersecting areas detectors.

2. The device of claim 1, wherein at least four light-receiving components are coupled with each of the sensor elements.

3. The device of claim 1, wherein at least one of the light-receiving components is a horizontal detector positioned to detect areas that extend horizontally in the photographic field, said at least one of the light-receiving components being offset from the intersecting areas detector.

4. The device of claim 3, wherein said horizontal areas detector and said intersecting areas detector are coupled with a common sensor element.

5. The device of claim 1, wherein at least one of the light-receiving components is positioned to detect areas that extend at an angle to horizontal and vertical directions in the photographic field, said at least one of the light-receiving components being offset from the intersecting areas detector.

6. The device of claim 5, wherein said at least one light-receiving component that is positioned to detect areas that extend at an angle to horizontal and vertical directions and said intersecting areas detector are coupled with a common sensor element.

7. The device of claim 1, wherein some of the light-receiving components are positioned on both sides of the intersecting areas detector, to detect areas on both sides of the intersecting areas in the photographic field.

8. The device of claim 7, wherein said light-receiving components are positioned to detect areas that extend horizontally in the photographic field on one side of the intersecting areas and to detect areas that extend at an angle to horizontal and vertical directions in the photographic field at an opposite side of the intersecting areas.

9. The device of claim 1, wherein some of the light-receiving components are arranged perpendicular to a line passing through a center of the intersecting areas detector to detect areas that are perpendicular to a line passing through a center of the intersecting areas in the photographic field.

10. The device of claim 9, wherein said line passes through a center of the light-receiving components that are arranged perpendicular to said line.

11. The device of claim 9, wherein some of said light-receiving components are located on a common sensor element.

12. The device of claim 1, wherein each of the plurality of detectors is coupled with a different sensor element.

13. The device of claim 12, wherein each of the plurality of detectors is an intersecting areas detector for detecting mutually intersecting areas in the photographic field.

14. The device of claim 1, wherein the plurality of sensor elements are aligned horizontally.

15. The device of claim 1, wherein the plurality of sensor elements all are identical.

16. A focus-detecting device for receiving light rays from a photographic field to detect a state of focus of a lens, the focus-detecting device comprising:

sensor means for receiving light rays from the photographic field, the sensor means comprising a plurality of sensor elements, at least one of the sensor elements being adjustably positionable independently of another of the sensor elements; and light-receiving means coupled with the sensor means for receiving the light rays from the photographic field, the light-receiving means comprising detection means for detecting different areas in the photographic field to detect a state of focus of the lens, at least one of said plurality of sensor elements having one intersecting areas detection means for detecting mutually intersecting areas in the photographic field, and another of said plurality of sensor elements having less than two of said intersecting areas detection means.

17. The device of claim 16, wherein the light-receiving means comprises at least four light-receiving components coupled with each of said plurality of sensor elements.

18. The device of claim 16, wherein the light-receiving means is positioned to detect areas that extend horizontally in the photographic field on both sides of the intersecting areas.

19. The device of claim 18, wherein the light-receiving means is positioned to detect areas that extend at an angle to horizontal and vertical directions in the photographic field.

20. The device of claim 16, wherein the light-receiving means is positioned to detect areas that extend horizontally in the photographic field on one side of the intersecting areas and to detect areas that extend at an angle to horizontal and vertical directions in the photographic field at an opposite side of the intersecting areas.

21. The device of claim 16, wherein the light-receiving means is positioned to detect areas that are perpendicular to a line passing through a center of the intersecting areas in the photographic field.

22. The device of claim 21, wherein said line passes through a center of the areas that are arranged perpendicular to said line.

23. A method of detecting a state of focus of a lens, comprising:

adjustably positioning one of a plurality of independently adjustably positionable sensor elements of a sensor that receives light rays from a photographic field via the lens; and detecting different areas in the photographic field with a plurality of detectors formed of grouped light-receiving components coupled with the sensor elements to detect a state of focus of the lens, at least one of said plurality of sensor elements having one detector that is an intersecting areas detector that detects mutually intersecting areas in the photographic field, and another one of said plurality of sensor elements has less than two of said intersecting areas detectors.

24. The method of claim 23, wherein the detecting step includes detecting areas extending horizontally in the photographic field with detectors offset from the intersecting areas detector.

25. The method of claim 23, wherein the detecting step includes detecting areas extending at an angle to horizontal and vertical directions in the photographic field with detectors offset from the intersecting areas detector.

26. The method of claim 23, wherein the detecting step includes detecting areas arranged perpendicular to a line passing through a center of the intersecting areas.

27. The method of claim 26, wherein said line passes through a center of the areas that are arranged perpendicular to said line.

* * * * *